March 1, 1949.  J. P. WEATHERHEAD  2,463,336
COUPLING
Filed March 15, 1945
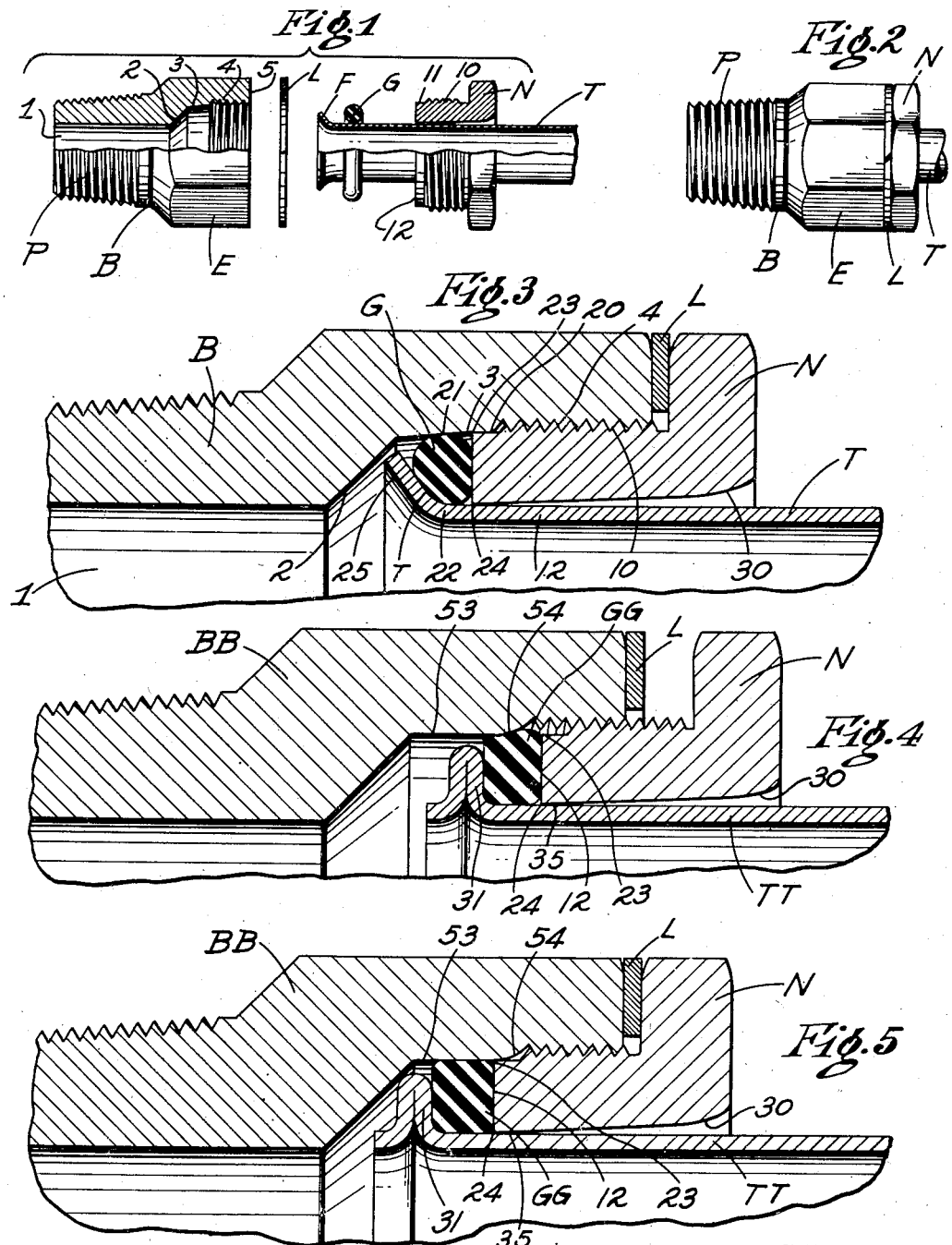
INVENTOR.
JOHN P. WEATHERHEAD
BY
ATTORNEYS Patented Mar. 1, 1949

2,463,336

UNITED STATES PATENT OFFICE 2,463,336

COUPLING

John P. Weatherhead, Cleveland, Ohio, assignor to The Weatherhead Company, Cleveland, Ohio, a corporation of Ohio Application March 15, 1945, Serial No. 582,828

6 Claims. (Cl. 285—90)

1

This invention relates to tube fittings or couplings and more particularly to vibration resistant coupling requiring relatively low wrench torque for assembly.

In the art of tube couplings or fittings one of the substantial elements of cost in the manufacture thereof has been the forming of the inverted seat portion in the bottom of the bore of a female member. Numerous efforts have been made to reduce the cost of making this part of the coupling. It is among the objects of my invention to eliminate the prior art seat portion of couplings of this type. Another problem with which the art has been confronted is that of the failure of such couplings under the influence of vibration especially where much of the vibration strain has been centered at the base of the flared end of the tube which is coupled between the inclined faces of the male and female seat parts. One of the objects and purposes of my invention is to eliminate this concentration of the load and strain of vibration from the tube adjacent the flared or enlarged end thereof and to provide a coupling which is highly resistant to vibration in the sense that the tube is freed from the strains, burdens and concentrations of strains and burdens incident to vibration. Vibration has also been a problem in this art to the extent of tending to loosen the joint, i. e., to cause the parts to become so loosened as to permit leakage of the fluids sought to be contained therein, and it is among the objects and purposes of my invention to provide a coupling which will be greatly improved in its function of resisting vibration in the sense that it will remain mechanically secure as well as fluid tight under the strains and influence of vibration. In prior art couplings especially of the inverted seat type one of the elements of cost of manufacture thereof has been to provide the male and female members with sufficient length and/or strength of threads to sustain the relatively high torque incident to the squeezing of the flared tube end between the conical male and female seats to effect a fluid tight seal and engagement therebetween. The strength of such threads for such purpose has as a rule been in excess of the strength required to withstand the fluid pressures ordinarily imposed upon such couplings, and it is within the objects and purposes of my invention to eliminate the need of imposing a high torque to obtain a fluid tight and mechanical seal between the assembled parts.

Other and more general objects include the provision of a vibration-proof coupling adapted

2 to couple tubes either with a flared or enlarged end regardless of the precise shape of the end, to make a fluid tight joint with such a tube and to make a vibration resistant joint both in respect to the effects of vibration upon the tube and on the coupling. Other objects include the provision of such a coupling that will be sturdy and strong and will be economical of manufacture and will have high facility of and low wrench torque in assembly and disassembly.

Other objects will appear from the following description of preferred forms of my invention reference being had to the accompanying drawings in which Figure 1 is an elevation partly in longitudinal section of the disassembled parts of one form of my coupling. Figure 2 is a side elevation of the assembled coupling comprising the parts shown in Figure 1. Figure 3 is a partial longitudinal section through the parts as assembled in Figure 2 shown on an enlarged scale. Figures 4 and 5 illustrate a modified form of my invention, in Figure 4 the parts being shown in partial longitudinal section preliminary to final assembly and in Figure 5 the parts are shown in the same partial longitudinal section but after final assembly thereof.

Referring particularly to Figures 1 and 2 I have shown the tube T having its end F flared and upon which, preliminary to the flaring or enlarging of the end F, has been positioned a nut or male member N and a sealing ring or gasket G. Complimentarily disposed to the nut N is a female body member B, the exterior of which may take any conventional form such as having pipe threads at P and a non-circular exterior as at E. Preferably there is also provided a lock washer L to be engaged between the nut N and the end face of the body B through which to aid in securing the parts in mechanical engagement one to the other.

The female body B may contain a bore I the diameter of which is preferably substantially coextensive with the internal diameter of the tube T. Adjacent the inward end of the bore I the interior of the body may be enlarged as by the ordinary terminus of a drill point as at 2. Adjacent this enlargement I provide a smooth internal annular surface 3 which preferably is slightly tapered, as for example at an angle of about 2 degrees to 5 degrees to the axis of the body. The surface 3 will preferably and conveniently have an axial length approximately twice the longitudinal dimension of the gasket G, and as discussed more fully in connection with the enlarged view in Figure 3 will constitute a bearing and sealing surface coacting with the gasket G in the operation of my invention. Rightwardly of the smooth sealing surface 3 I provide female threads 4 extending to the open end 5 of the body.

The nut or male member N has straight external threads 10 adapted to coact with the female threads 4, and the nut preferably has a short smooth nose 11 extending beyond the threaded area and adapted to enter within the surface 3 a limited distance. The nut terminates preferably in a smooth radial surface 12 which is adapted to engage the sealing gasket G.

To effect the coupling or connection of the parts, the tube T with its flared end F is inserted into the female body and the threads of the male and female parts are engaged; the nut being screwed preferably to a fully seated and mechanically locked relation to the body as shown more particularly in Figure 3. In this relation of the parts it will be seen that the gasket G is engaged between the surface 3 of the female body, the end face 12 of the nut and the external surfaces of the tube T and the flared end F thereof. Preferably the gasket G is formed of rubber or rubber-like material having a Durometer hardness of about from 50 to 60 so that the gasket will have the quality of sealing amidst the minute irregularities and interstices of the surfaces of the tube and the sealing surface 3, but will have within itself a considerable toughness or rigidity whereby to resist deformation, as well as "cold flow" under the influence of high fluid pressures exerted upon it over a substantial period of time. The gasket G in its idle condition as shown in Figure 1 preferably has its internal diameter such as to contact or engage the outer cylindrical surface of the tube T, and has its external diameter at least as large as the maximum internal diameter of the surface 3 of the body B. Preferably the gasket G is round in cross section as shown in Figure 1 albeit other cross sectional forms have utility within the precepts of my invention as will be more fully discussed below.

When the parts shown in Figure 1 are being brought to the assembled relation as shown in Figures 2 and 3 it will be observed that the outer surface of the gasket G will have first engaged the surface 3 at about the point 20 and that as the nut N advances in the threads 4 of the female body the gasket G will be advanced within the tapering confines of the surface 3 as resisted by the internal support afforded to it by the external surfaces of the tube T and the flared end F thereof. When the gasket G has been advanced to about the position shown in Figure 3 and bears upon the surface 3 in and about the point 21, that part of the gasket in contact with the surface 3 will have been flattened somewhat, i. e., reduced in diameter, the gasket being squeezed a little radially between about the point 21 and the point 22 on the outer surface of the tube T adjacent the flare at the end thereof. As shown in Figure 3 the gasket will have been distorted somewhat from an initial round form as shown in Figure 1 to the slightly distorted form shown in Figure 3 and will be reacting against the surface 3 and the exterior surface of the tube whilst the innermost parts of the tube are still spaced from the adjacent surfaces of the female body B. The gasket will be restrained from bodily tipping or canting within the general limitations of the space between the front face 12 of the nut and the external surfaces of the tube T and the flared end F thereof while still having room to "work" and seal under fluid pressure.

As shown in Fig. 3 the nut N has been threaded home, squeezing the lock washer L to a locking position whereby to lock the nut within the female body. At the same time the outer annular corner 23 of the front end of the nut adjacent the face 12 will have made substantial contact with the inclined surface 3, and if desired may have actually made contact at that point, to inhibit extrusion of the gasket G between the forward end of the nut and the adjacent surface of the body under condition of high or long continued fluid pressure. In this form of my invention I prefer that the internal bore 3 degrees of the nut N be tapered slightly having its minimum, and small, clearance from the tube T adjacent the face 12 of the nut as at 24 whereby to resist gasket extrusion at that point while permitting angular freedom of movement between the tube and the nut remote from the gasket where the end of the tube is supported. Preferably the gasket provides the substantially exclusive support for the tube.

When the parts are assembled as shown in Figure 3 the nut and the body are secured together through the action of the lock nut L and are vibration resistant in their engagement whereby to withstand mechanical vibration and/or other vibration without tending to be separated one from the other. The small compression of the gasket as shown in Figure 3 provides an initial fluid seal which is maintained and enhanced under fluid pressure since fluid pressure deforms the gasket into tighter contact with the external wall of the tube and the surface 3. In this form of my invention it will be noted that no mechanical effort is being expended on gripping or deforming the flared end of the tube as is the common practice in flared tube fittings when the flared end of the tube is engaged between conical seats, and that the actual effort of compressing the gasket is of modest amount because of the yielding nature of the gasket, the small amount of compression required and because the gentle slope of the surface 3. As a practical matter ordinary finger effort is usually sufficient to bring the parts to substantially the condition shown in Figure 3 except for the last fraction of a turn required to flatten the lock washer L. The greatest mechanical effort is ordinarily used to compress the lock washer L to lock the parts where that is desired. My invention has utility without the use of the lock washer L, the other parts being proportioned to bring the nut and body into substantially the same relation shown in Figure 3 in the absence of the lock washer as for example by shortening the nut or by substituting a plain washer for the lock washer. Without a lock washer I prefer that the nose of the nut have a wedging contact with the surface 3 of the body.

In Figures 4 and 5 I have illustrated a modified form of my invention in which the nut N with its tapered internal bore 30 clears the outer wall of the tube TT by a small amount as at 35 and clears the outer wall of the tube more freely at the open outer end of the nut. The tube TT instead of having a flared end as above discussed has an annular rib or enlargement 31, preferably consisting of an annular fold in the wall of the tube whereby to produce substantially radial surfaces on the enlarged portion thereof. In the form of my invention shown in Figures 4 and 5 the body BB may substantially correspond to the body B above discussed and the lock washer L may be employed for the same reasons in the same way.

As shown in Figure 4 the gasket GG in its relatively unstressed condition as shown in Figure 4 may be substantially square in cross section and as above mentioned preferably has a snug or contacting fit on the outer surface of the tube TT prior to its entry into the coupling body. The outer annular surface of the gasket GG preferably has a diameter not substantially smaller than the greatest diameter of the flared mouth 54 of the cylindrical bore 53 of the body BB so that the gasket first contacts the open end of the flare 54, and by forward movement from the position shown in Figure 4 to that shown in Figure 5 the gasket is compressed a little radially between the surface 53 and the outer surface of the tube TT. When the parts assume the position shown in Figure 5 the end of the tube TT is supported by and upon the compressed gasket GG and is preferably held out of contact with the body B and is also substantially out of contact with the nut N. In this form of my invention as in the form first above described when the parts are "home" the nut is secured in mechanically locked relation to the body B, and the innermost forward corner of the nut as at 23 may be in substantial contact with the surface 53 or the inner part of the flare 54 whereby to prevent the tendency of the gasket to flash or cold flow between the adjacent surfaces of the nut and body. The gasket as shown in Figure 5 has been distorted somewhat by radial compression thereof to fit between the outer surface of the tube TT and the sealing surface 53 of the body BB and takes a somewhat different form from its initial form whereby to have an initial sealing radial pressure and contact with the adjacent axial surfaces prior to the exertion of fluid pressure thereupon. In this form of my invention as well as in the form first above described the forward face 12 of the nut N is preferably smooth and radial whereby to rub smoothly upon the gasket GG as the nut advances within the body and advances the gasket into its initial state of compression. The inner annular corner 24 of the nut may have but little clearance from the wall of the tube TT to resist "flash" or "cold flow" of the gasket since the tapering bore of the nut admits vibratory and other movement of the tube TT therein without substantial radial movement adjacent the gasket.

While I have spoken of a compressed state of the gaskets G and GG, essentially this compression is preferably only sufficient in the first instance to obtain an initial sealing contact which will be automatically augmented by fluid pressure to then distort the gasket to get the necessary ultimate sealing effect. The initial compression need be of not such magnitude as to impair the resiliency of the support of the tube by the gasket, as might otherwise result from squeezing the gasket into a blind or constricted space as has sometimes been practiced in prior art couplings. Those skilled in the art familiar with the mode of operation of resilient rubber-like gaskets under fluid pressure will recognize that the greater the fluid pressure contained within the coupling and the tubes coupled therein as shown in my invention, the greater will be the sealing effect whereby to insure a leak proof as well as a vibration resistant joint.

While I have illustrated and described preferred and modified forms of my invention, changes, modifications and improvements will occur to those skilled in the art upon their practice and understanding of the precepts and teachings hereof, and I do not care to be limited in the scope of my patent to the preferred or particular forms herein illustrated and described or in any manner other than by the claims appended hereto.

I claim:

1. In a tube coupling, a tube having a radially enlarged part near the end thereof, a body having a recess adapted to receive the enlarged end of the tube, a nut adapted to enter the body and be secured therein, and a yielding packing member engaging the enlarged part of the tube, the end of said nut, and the inner surface of the body recess, said packing member being compressed radially but slightly in its disposition between said parts, the enlarged part of said tube being clear of the wall of said body recess after said nut is secured in its innermost position in said body.

2. The combination of claim 1 in which said inner surface of said body has at least a tapering portion with which the end of said nut is substantially in contact when the parts are operatively assembled.

3. The combination of claim 1 with means for locking said nut and body in fixed relation while permitting movement of said tube relative thereto in said member.

4. In combination a female coupling member having an open end and an internal sealing surface with at least a part tapering with its larger diameter toward said open end, a tubular member having an enlarged end adapted to be received through said open end within said female member with the enlarged end of said tubular member juxtaposed to but out of contact with said sealing surface, a rubber-like sealing member radially compressed between the sealing surface of said female member and the sealing surface of said body member adjacent the enlarged end of said tubular member, and a male member entering said female member and substantially contacting said tapering part of said surface and restricting bodily movement of said sealing member away from the said sealing surface and preventing movement of said tubular member bodily outward of said body member while permitting limited angular movement of said tubular member within said body member.

5. A tubular member having an enlarged part adjacent the end thereof, a sealing gasket disposed around said tubular member adjacent said enlarged part, a body member receiving the end of said tubular member and said gasket and constraining said gasket to a compressed relationship radially toward said tubular member, said members having parts inclined relative to the tube axis and toward each other adjacent to and in contact with said gasket, and means acting longitudinally upon said gasket and urging the same between the inclined parts of said members whereby to compress said gasket radially and support said tubular member within said body member without contact therewith other than through said gasket.

6. A tubular member having an enlarged part adjacent the end thereof, a sealing gasket disposed around said tubular member adjacent said enlarged part, a body member receiving the end of said tubular member and said gasket and constraining said gasket to a radially compressed condition upon said tubular member, said members having parts inclined toward their axis and toward each other adjacent to and in contact with said gasket, and annular means acting longitudinally upon said gasket and urging the same between the inclined parts of said members to a diminishing space therebetween whereby to compress said gasket radially and support said tubular member within said body member without contact therewith other than through said gasket, said annular means substantially contacting the inclined part of one of said members adjacent said gasket in its innermost position in said body.

JOHN P. WEATHERHEAD.

REFERENCES CITED

The following references are of record in the file of this patent:

UNITED STATES PATENTS

| Number | Name | Date |
|---|---|---|
| 1,894,700 | Parker | Jan. 17, 1933 |
| 2,332,893 | Clickner | Oct. 26, 1943 |
| 2,354,538 | Parker | July 25, 1944 |
| 2,364,447 | Haynes | Dec. 5, 1944 |